United States Patent
Zimmermann et al.

(10) Patent No.: US 11,316,224 B2
(45) Date of Patent: Apr. 26, 2022

(54) BATTERY ARRANGEMENT FOR THE LOAD-BEARING STRUCTURAL INTEGRATION OF BATTERIES INTO A VEHICLE

(71) Applicant: AIRBUS DEFENCE AND SPACE GMBH, Taufkirchen (DE)

(72) Inventors: Kristian Zimmermann, Munich (DE); Florian Dorn, Dietramszell (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 0 days.

(21) Appl. No.: 16/360,757

(22) Filed: Mar. 21, 2019

(65) Prior Publication Data

US 2019/0296300 A1  Sep. 26, 2019

(30) Foreign Application Priority Data

Mar. 22, 2018 (DE) ...................... 10 2018 204 420.1

(51) Int. Cl.
*H01M 50/20* (2021.01)
*B60L 50/60* (2019.01)
(Continued)

(52) U.S. Cl.
CPC ............ *H01M 50/20* (2021.01); *B60L 50/66* (2019.02); *B64D 27/24* (2013.01); *B64G 1/425* (2013.01);
(Continued)

(58) Field of Classification Search
CPC ......... H01M 2/10–1094; H01M 10/42; H01M 10/60–627; H01M 10/64–6595;
(Continued)

(56) References Cited

U.S. PATENT DOCUMENTS 8,383,260 B2  2/2013  Essinger et al.
8,833,499 B2  9/2014  Rawlinson
(Continued)

FOREIGN PATENT DOCUMENTS

CN  205 583 100 U  9/2016
CN  106 240 798 A  12/2016
(Continued)

OTHER PUBLICATIONS

Machine translation of Kaese et al. DE 10 2015214185. Published Mar. 30, 2017. (Year: 2017).*
(Continued)

*Primary Examiner* — Jonathan Crepeau
*Assistant Examiner* — Jacob Buchanan
(74) *Attorney, Agent, or Firm* — Jenkins, Wilson, Taylor & Hunt, P.A.

(57) ABSTRACT

A battery arrangement for the load-bearing structural integration of batteries into a vehicle, in particular an aircraft or spacecraft, includes two cover plates having battery holders and batteries, which are held on both sides between the cover plates by the battery holders, wherein the batteries are arranged in battery rows along the cover plates, wherein the batteries in the battery rows are each aligned at a slope angle relative to the cover plates in order to absorb and transmit loads, and wherein the slope angle in the battery rows has positive and negative values.

19 Claims, 3 Drawing Sheets

(51) Int. Cl.
  *B64D 27/24* (2006.01)
  *B64G 1/42* (2006.01)
  *H01M 10/6556* (2014.01)
  *H01M 10/625* (2014.01)
  *H01M 10/613* (2014.01)
  *H01M 50/242* (2021.01)
  *H01M 50/249* (2021.01)
  *H01M 50/209* (2021.01)
  *H01M 50/213* (2021.01)

(52) U.S. Cl.
  CPC ....... *H01M 10/613* (2015.04); *H01M 10/625* (2015.04); *H01M 10/6556* (2015.04); *H01M 50/242* (2021.01); *H01M 50/249* (2021.01); *B60L 2200/10* (2013.01); *H01M 50/209* (2021.01); *H01M 50/213* (2021.01); *H01M 2220/20* (2013.01)

(58) Field of Classification Search
  CPC ........... H01M 50/20–253; H01M 50/267–269; B60L 50/50; B60L 50/60–66; B64D 27/00; B64D 27/02; B64D 27/16; B64D 27/24; B64G 1/42; B64G 1/425
  See application file for complete search history.

(56) References Cited

U.S. PATENT DOCUMENTS

| | | | |
|---|---|---|---|
| 8,967,529 B1 | 3/2015 | Bennett | |
| 9,559,394 B2 | 1/2017 | Eckl et al. | |
| 11,217,839 B2 | 1/2022 | Zimmerman et al. | |
| 2006/0125442 A1* | 6/2006 | Andersson | B60K 1/04 320/104 |
| 2009/0255109 A1 | 10/2009 | Weber et al. | |
| 2010/0047682 A1* | 2/2010 | Houchin-Miller | H01M 10/613 429/120 |
| 2011/0183183 A1* | 7/2011 | Grady | H01M 6/40 429/152 |
| 2011/0212355 A1 | 9/2011 | Essinger et al. | |
| 2012/0100407 A1 | 4/2012 | Inoue et al. | |
| 2013/0065103 A1 | 3/2013 | Yumura | |
| 2015/0266387 A1* | 9/2015 | Garfinkel | B60L 50/64 180/65.1 |
| 2015/0349390 A1* | 12/2015 | Aiba | H01M 2/1077 429/90 |
| 2016/0056430 A1* | 2/2016 | Burkman | H01M 50/528 429/99 |
| 2016/0276637 A1 | 9/2016 | Kusaba | |
| 2017/0047624 A1 | 2/2017 | Gunna et al. | |
| 2018/0040862 A1* | 2/2018 | Yi | H01M 50/502 |
| 2018/0175466 A1 | 6/2018 | Seo et al. | |
| 2019/0252655 A1 | 8/2019 | Zimmermann | |
| 2019/0252744 A1 | 8/2019 | Zimmermann et al. | |
| 2019/0334134 A1 | 10/2019 | Reingruber et al. | |
| 2020/0099030 A1 | 3/2020 | Shimizu et al. | |

FOREIGN PATENT DOCUMENTS

| | | |
|---|---|---|
| CN | 110165098 A | 8/2019 |
| CN | 110165100 A | 8/2019 |
| CN | 110294133 A | 10/2019 |
| DE | 10 2011 016 738 A1 | 10/2012 |
| DE | 10 2012 213 273 A1 | 2/2014 |
| DE | 10 2015 214 185 B4 | 3/2017 |
| DE | 10 2016 010 830 A1 | 3/2017 |
| DE | 10 2016 120 838 A1 | 5/2018 |
| EP | 3 220 444 A1 | 9/2017 |
| EP | 3 525 257 A1 | 8/2019 |
| EP | 3 525 259 A1 | 8/2019 |
| EP | 3 544 083 A1 | 9/2019 |
| EP | 3 525 257 B1 | 8/2020 |
| EP | 3 525 259 B1 | 12/2020 |
| JP | 2019194972 A | 11/2019 |
| KR | 20190098705 A | 8/2019 |
| WO | WO 2011/149868 A1 | 12/2011 |
| WO | WO 2017/004078 A1 | 1/2017 |

OTHER PUBLICATIONS

Machine translation of Ma et al. CN 106240798. Published Dec. 21, 2016. (Year: 2016).*
Extended European Search Report for Application No. 19155733.9 dated Apr. 9, 2019.
European Search Report for Application No. 19162541.7 dated Jun. 27, 2019.
Extended European Search Report for Application No. 19156600.9 dated Jul. 11, 2019.
German Office Action for Application No. 10 2018 202 120.1 dated Dec. 14, 2018.
German Office Action for Application No. 10 2018 202 114.7 dated Dec. 20, 2018.
European Office Action for Application No. 19156600.9 dated Mar. 20, 2020.
Non-Final Office Action for U.S. Appl. No. 16/272,010 dated Aug. 21, 2020.
Non-Final Office Action for U.S. Appl. No. 16/272,363 dated Dec. 18, 2020.
Final Office Action for U.S. Appl. No. 16/272,010 dated Apr. 13, 2021.
Final Office Action for U.S. Appl. No. 16/272,363 dated May 19, 2021.
Advisory Action for U.S. Appl. No. 16/272,010 dated Jun. 1, 2021.
Non-Final Office Action for U.S. Appl. No. 16/272,363 dated Aug. 30, 2021.
Notice of Allowance and Interview Summary for U.S. Appl. No. 16/272,010 dated Sep. 3, 2021.
Notice of Allowance for U.S. Appl. No. 16/272,363 dated Dec. 22, 2021.

* cited by examiner

BATTERY ARRANGEMENT FOR THE LOAD-BEARING STRUCTURAL INTEGRATION OF BATTERIES INTO A VEHICLE

CROSS-REFERENCE TO RELATED APPLICATION

This application claims priority to German Patent Application No. 10 2018 204 420.1 filed Mar. 22, 2018, the entire disclosure of which is incorporated by reference herein.

TECHNICAL FIELD

The disclosure herein relates to a battery arrangement for the load-bearing structural integration of batteries into a vehicle, especially an aircraft or spacecraft.

BACKGROUND

Although it can be used in many applications, the disclosure herein and the problems underlying it are explained in greater detail in relation to passenger aircraft. However, the methods and devices described can likewise be used in different vehicles and in all sectors of the transport industry, e.g. for road vehicles, for rail vehicles, for aircraft or for watercraft.

Lithium ion accumulators can be found as rechargeable energy storage devices in many different areas of engineering. In particular, they are used in the case of electrically powered mobility as energy storage devices for electric cars and hybrid vehicles. To this end, many manufacturers implement a large number of batteries or battery cells in the form of "battery packs" into a vehicle structure, e.g. a motor vehicle body; see, for example, documents U.S. Pat. No. 8,833,499 B2 and DE 10 2015 214 185 B4. In a battery pack or battery set of this kind, it is quite possible for several thousand individual cells to be interconnected, e.g. round lithium ion cells with a cylinder diameter of about 20 mm and a length of about 100 mm.

However, the generic integration concepts pursued in this context are not always suitable for satisfying the technical requirements and boundary conditions for aircraft from a structural point of view. Additional reinforcing measures, e.g. supplementary reinforcing structures, would directly increase the weight and thus ultimately fuel consumption.

In a typical application, it is unavoidable to provide active temperature control of the batteries to enable such batteries to be operated as efficiently as possible. This is relevant not least in the aerospace sector owing to the greatly fluctuating operating and ambient temperatures. For suitable temperature control of the batteries of a battery pack, it is possible, for example, to use devices such as cooling plates or the like, in which a liquid and/or a gas is passed through fluid channels; see, for example, documents U.S. Pat. No. 8,383, 260 B2 and US 2017/0047624 A1. Cooling devices of this kind further increase the weight.

SUMMARY

Given this background situation, it is an underlying object of the disclosure herein to find solutions for efficient and lightweight integration of a large number of battery cells into a vehicle.

This object is achieved by a battery arrangement and by an aircraft or spacecraft having features disclosed herein.

Accordingly, a battery arrangement for the load-bearing structural integration of batteries into a vehicle is provided. The battery arrangement comprises two cover plates having battery holders, and a multiplicity or plurality of batteries, which are held on both sides between the cover plates by the battery holders, wherein the batteries are arranged in battery rows along the cover plates, wherein the batteries in the battery rows are each aligned at a slope angle relative to the cover plates in order to absorb and transmit loads, wherein the slope angle in the battery rows has positive and negative values.

An aircraft and spacecraft having a battery arrangement according to the disclosure herein is furthermore provided.

One concept underlying the disclosure herein comprises designing a battery arrangement, e.g. a battery module or a battery pack, as a load-bearing structural element which not only bears its own inherent load but likewise absorbs and/or transmits extraneous loads introduced as appropriate to a structural component, i.e. contributes to the formation or reinforcement of an overall structure of a vehicle. The battery arrangement can thus to a certain extent replace existing structures since loads can be passed through the battery arrangement. For this purpose, the battery arrangement according to the disclosure herein is of sandwich-type construction, in which a multiplicity or plurality of batteries or battery cells is held between two cover plates. In this case, tensile, compressive and/or shear forces can be passed directly through the batteries or battery cells. In this way, additional structure-reinforcing components can be eliminated, this in turn optimizing the number of components and ultimately the weight. From another point of view, it is possible by these measures to improve the weight-dependent energy or power density of a battery arrangement or of a vehicle.

In order to absorb shear forces from different directions, the batteries in this arrangement are aligned both with positive and negative slope angles relative to the cover plates. In principle, slope angles in the sense according to the disclosure herein comprise angles with magnitudes between 0° and 90°. For example, a battery with a slope angle of 0° is aligned parallel to the cover plates, while a battery at a slope angle of 90° is perpendicular to the cover plates. In the disclosure herein, a negative slope angle means that batteries slope in the opposite direction to batteries with a positive slope angle of the same magnitude, relative to a fixed spatial direction (e.g. a direction along a battery row), wherein the magnitude of the slope angle in this case is greater than 0° and less than 90°. This means that at least a proportion of the batteries in the disclosure herein is aligned at a slope angle $\alpha=\pm X$ where $0°<|X|<90°$. However, this does not exclude the possibility that at least another proportion of the batteries has a slope angle of 90°, for example. For example, batteries in a first battery row are aligned at a slope angle of 45°. A parallel second battery row can then have batteries at a slope angle of −45°, for example, i.e. the batteries in the second battery row slope in the opposite direction to the batteries in the first battery row. In another example, batteries are aligned at a slope angle of 45° in a first battery row, at 90° in a second battery row and at −45° in a third battery row. Fundamentally, however, the disclosure herein likewise includes embodiments in which the slope angles of the batteries also vary within the battery rows, e.g. have different positive and/or negative values, in order to achieve optimum load distribution across the batteries or the battery arrangement. In the disclosure herein, the batteries can thus be arranged along the load paths, for example, making it possible, in particular, to cover all load directions. In other words, the batteries or battery cells of the disclosure herein are arranged and aligned in such a way that the structure of the battery arrangement is reinforced or stiffened and primary loads can be absorbed in an optimum manner by the battery arrangement.

As will be immediately clear to a person skilled in the art, sandwich constructions according to the disclosure herein can furthermore be combined with one another, e.g. by layering them one above the other to create complex structures with a plurality or multiplicity or plurality of sandwich layers.

A battery in the sense according to the disclosure herein is a general rechargeable electric storage element. This can be a secondary cell, i.e. an individual storage element in the sense of a secondary element, an accumulator cell, a storage cell, a battery cell or the like. In principle, however, batteries according to the disclosure herein likewise include interconnected secondary cells and/or interconnected storage elements, i.e. a battery consisting of or comprising secondary cells. In particular, batteries in the sense according to the disclosure herein include accumulators, e.g. lithium ion accumulators. The battery holders can be designed, in particular, to receive cylindrical batteries or battery cells. In principle, however, battery or cell variants with other geometries are likewise provided, e.g. prismatic battery cells, wherein the battery holders can be correspondingly designed or configured to receive these cell types or battery types.

Advantageous embodiments and developments will emerge from the further dependent claims and from the description with reference to the figures.

According to a development, the slope angle in successive battery rows can alternately have positive and negative values. For example, a multiplicity or plurality of battery rows can be provided, which can be arranged substantially parallel to one another, wherein all the batteries or battery cells in each row can be aligned alternately with a positive slope angle and a negative slope angle, respectively. The resulting battery arrangement is thus not only stable in relation to compressive loads but is likewise stable in relation to shear loads in different directions. Fundamentally, however, the disclosure herein likewise includes embodiments in which the batteries or battery rows have positive and negative values in an alternating and varying manner, i.e. the batteries can have different positive and/or negative slope angles, inter alia even within the battery rows.

According to a development, the magnitude of the slope angle can have values greater than 0° and less than 90°. For example, all the batteries of the battery arrangement can be aligned at a slope angle with a fixed magnitude, e.g. 30°, 45°, 60° or 70° etc. In principle, however, the batteries of a battery arrangement can likewise have different positive and/or negative values for the slope angle. It is furthermore envisaged, for example, that the batteries can also have different slope angles within a single battery row. Depending on the application, a person skilled in the art will choose advantageous alignments of the batteries or battery rows to optimize the properties of the battery arrangement under the action of loads.

According to a development, the batteries in each battery row can have an identical slope angle. For example, all the batteries of a battery row can have a slope angle of ±30°, ±45°, ±60°, ±70° or ±80°.

According to a development, the magnitude of the slope angle can be 45°. For example, alternating battery rows can be provided, wherein all the batteries in a row can have a slope angle of either 45° or −45°.

According to a development, a proportion of the batteries can be arranged in intermediate battery rows. The intermediate battery rows can be situated between the battery rows. In the intermediate battery rows, the batteries can be aligned at a slope angle of 90° relative to the cover plates. For example, a repeating arrangement of three battery rows can be chosen, wherein all the batteries have a slope angle of 45° in a first battery row, a slope angle of 90° in a second battery row and a slope angle of −45° in a third battery row.

According to a development, the battery arrangement can furthermore have shear walls. The shear walls can connect the cover plates to each other. Two battery rows and/or intermediate battery rows in each case can be separated by one shear wall. In this case, the shear walls can serve different purposes. On the one hand, the shear walls reinforce the overall structure of the battery arrangement. On the other hand, the shear walls can serve additional functional purposes. In one specific example, the shear walls or a proportion of the shear walls can be designed or configured as protective walls or safety walls, e.g. as fire protection walls or walls for avoiding or restricting thermal penetration. In one example, the shear walls can be used to enclose any gases or liquids which may form in a damage event. As an alternative or in addition, shear walls can serve as cooling means or thermal distributors by providing them, for example, with a material having a suitable thermal conductivity or manufacturing from a material of this kind, e.g. a metal material and/or a phase change material or the like.

According to a development, the batteries can be mounted on both sides positively or in a materially integral manner in the battery holders. In a configuration of this kind, tensile, compressive and/or shear forces which occur can be optimally absorbed and transmitted via the batteries.

According to a development, the batteries can be of cylindrical design. The battery holders can be designed to receive cylindrical batteries. In this way, known and possibly standardized lithium ion accumulators can be provided, for example. As an alternative or in addition, the batteries can be of prismatic design. The battery holders can be correspondingly designed or configured to receive prismatic batteries.

According to a development, at least one of the cover plates can be designed or configured as a cooling plate. One or both of the cover plates can be formed from a metal material of high thermal conductivity, for example. According to a development, at least one of the cover plates can be designed or configured as a heat exchanger with a multiplicity or plurality of cooling fins in order to dissipate heat generated by the batteries towards the outside. As an alternative or in addition, one or both cover plates can comprise a phase change material.

According to a development, the cooling plate can be formed with a multiplicity or plurality of fluid channels. The cooling plate can be manufactured integrally from a metal material having a multiplicity or plurality of fluid channels, for example. The cooling plate can be manufactured from a metal, a metal alloy, a metallic material and/or a combination of these materials, for example. In one specific example, the cooling plate is manufactured from aluminium, an aluminium alloy and/or a composite material containing aluminium. For the purpose of reducing weight, the cover plates or cooling plates can, on the other hand, contain or be manufactured from a plastic or some other lightweight material, e.g. a thermoplastic or a fiber-reinforced plastic, such as a carbon fiber-reinforced plastic (CFRP). To manufacture the cover plates or cooling plates, it is possible, for example, to use an additive method, in which the plates are manufactured completely in an integral manner without the need for special expenditure, additional assembly steps or even manual work. Fundamentally, the cover plates or cooling plates can be manufactured from all materials or material combinations for which additive methods are known. A correspondingly advantageous choice of dimensioning can be made for the fluid channels, e.g. to enable a desired volume flow of a fluid, e.g. a gas or a liquid. Moreover, fluid channels can serve as a discharge channel in order to discharge any gases or liquids formed in a damage event.

According to a development, the battery arrangement can be designed or configured as a load-bearing structural component for an aircraft or spacecraft. Furthermore, however, the battery arrangement can likewise be designed or configured as a non-load-bearing secondary structure for an aircraft or spacecraft.

According to a development, the battery arrangement can be designed or configured as a side wall, floor panel, ceiling panel, skin area, wing spar, wing rib and/or wing covering or the like.

According to a development, the battery arrangement can form a load-bearing constituent of a load-bearing structural component of the aircraft or spacecraft. The battery arrangement can form a fuselage and/or aerofoil section of an aircraft or spacecraft, for example.

The above embodiments and developments can be combined in any desired manner, insofar as this is feasible. Further possible embodiments, developments and implementations of the disclosure herein also include combinations, not explicitly mentioned, of features of the disclosure herein that have been described above or are described below with reference to the illustrative embodiments. In this context, a person skilled in the art will, in particular, also add individual aspects as improvements or additions to the respective basic form of the disclosure herein.

BRIEF DESCRIPTION OF THE DRAWINGS

The disclosure herein is explained in greater detail below by the illustrative and example embodiments depicted in the schematic figures. Here.

DETAILED DESCRIPTION

The attached figures are intended to impart a greater understanding of the embodiments of the disclosure herein. They illustrate embodiments and, together with the description, serve to explain principles and concepts of the disclosure herein. Other embodiments and many of the advantages mentioned will become apparent from the drawings. The elements of the drawings are not necessarily shown to scale in relation to one another.

In the figures of the drawing, identical, functionally identical and identically acting elements, features and components are each provided with the same reference signs, unless explicitly stated otherwise.

Figure 1:
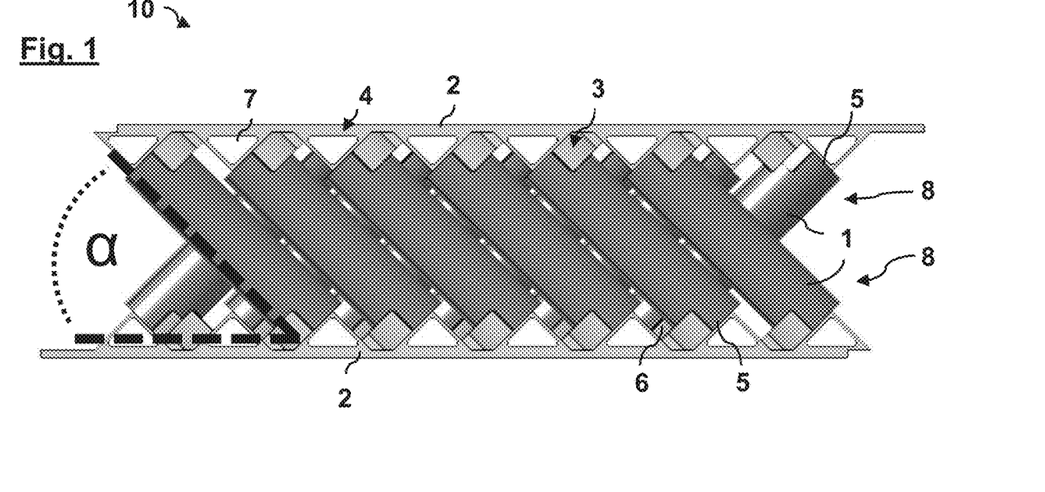
FIG. 1 shows a schematic side view of a battery arrangement according to one embodiment of the disclosure herein.

FIG. 1 shows a schematic side view of a battery arrangement 10 according to one embodiment of the disclosure herein.

Figure 3:
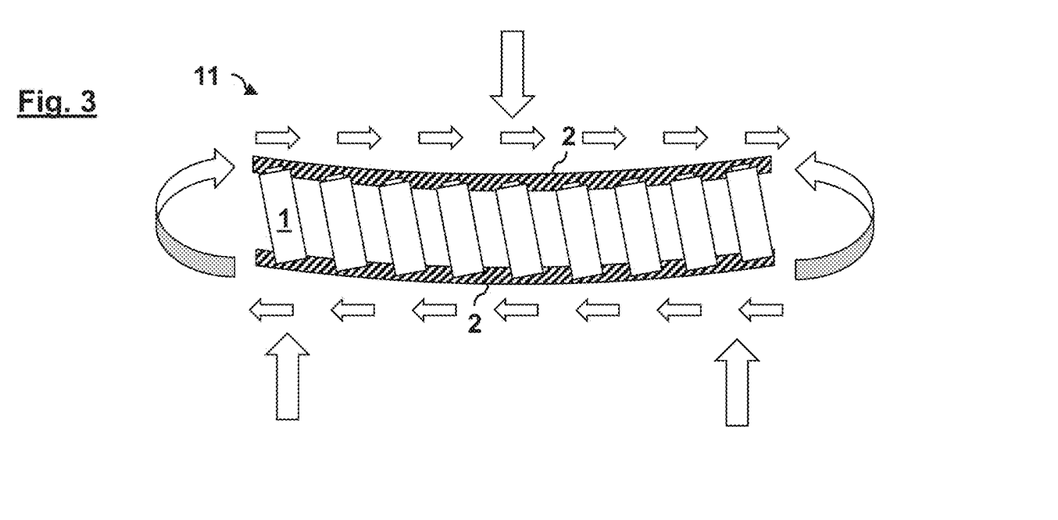
FIG. 3 shows a schematic sectional view of the battery arrangement from FIG. 1, which is used as a load-bearing structural component.
Figure 4A:
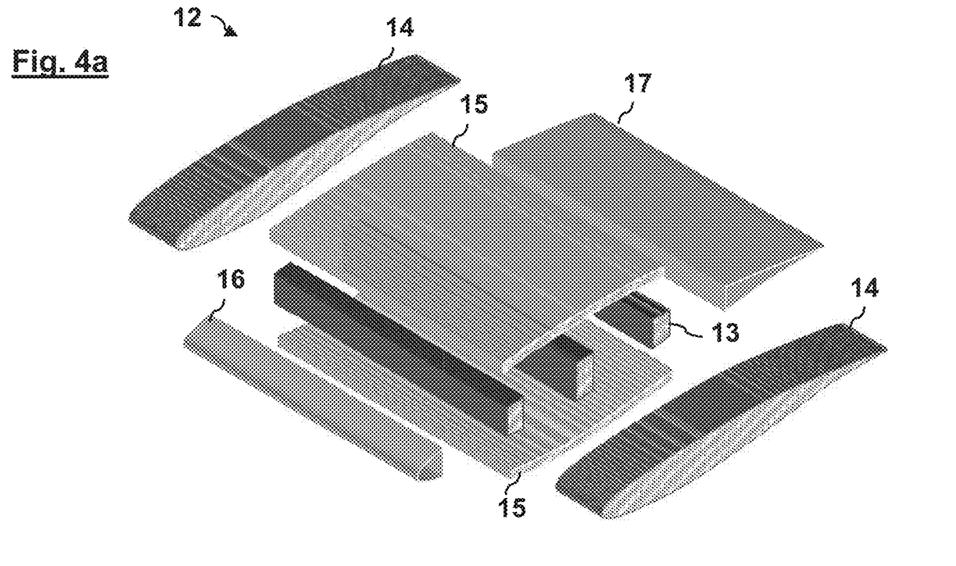
FIGS. 4a, b, c show schematic exploded, perspective and sectional views of an aircraft wing having battery arrangements according to FIG. 1.
Figure 4B:
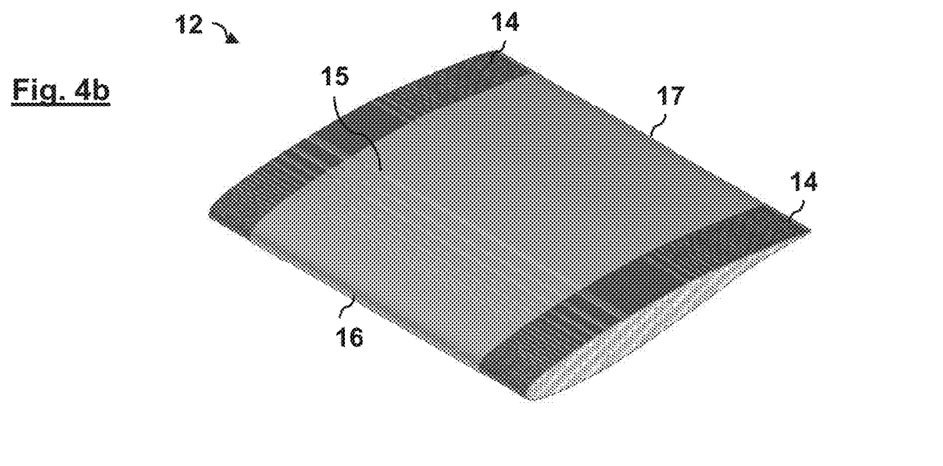
Figure 4C:
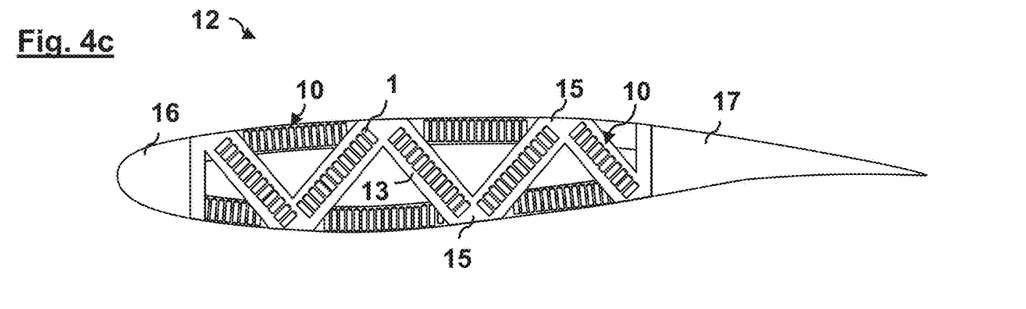
Figure 6:
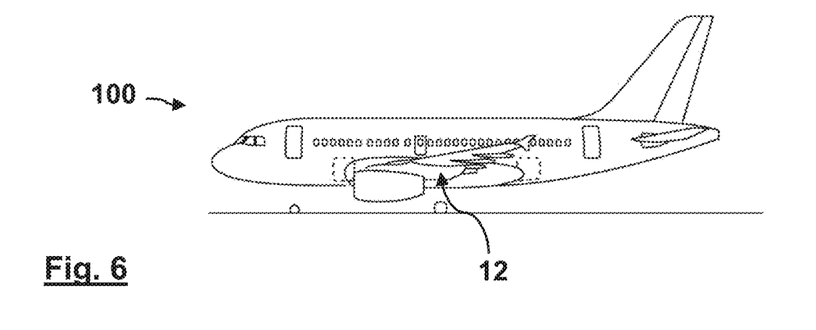
FIG. 6 shows a schematic side view of an aircraft having the aircraft wing from FIGS. 4a-c.

The battery arrangement 10 is used for the load-bearing structural integration of batteries 1 into a vehicle, e.g. into the aerofoil 12 of an aircraft 100 (e.g. a passenger aircraft), of the kind shown schematically in FIG. 6 (cf. FIGS. 4a-c). As explained below with reference to FIG. 3, the battery arrangement 10 here serves as a load-bearing structural component, i.e. the batteries 1 are integrated in this way into the primary and/or secondary structure of the vehicle. In other words, the batteries 1 form a load-bearing constituent of the structure of the vehicle. The battery arrangement 10 can form a battery module or a battery pack, for example, wherein the batteries 1 are battery cells in this case.

Figure 2:
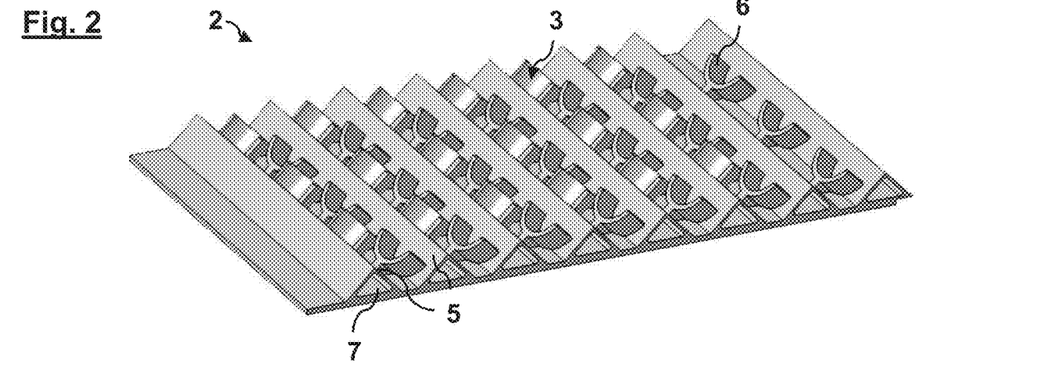
FIG. 2 shows a schematic perspective view of a cover plate of the battery arrangement from FIG. 1.

The battery arrangement 10 comprises two cover plates 2 of the kind shown by way of example in FIG. 2. Each cover plate 2 is provided with a battery holder 3, which is formed with a multiplicity or plurality of battery receptacles 6 for the accurately fitting, one-sided reception of a respective cylindrical battery 1, e.g. cylindrical lithium ion accumulators of the kind known in the automotive sector.

Furthermore, the battery arrangement 10 comprises a multiplicity or plurality of batteries 1 (or battery cells), which are held on both sides between the cover plates 2 by the battery holders 3. Here, the batteries 1 are arranged in adjacent battery rows 8 along the cover plates 2, wherein the batteries 1 in the battery rows 8 are each aligned at a slope angle α relative to the cover plates 2 in order to absorb and transmit loads. In the specific example in FIG. 1, the slope angle α is ±45°, wherein the batteries 1 are in each case aligned at 45° in one battery row 8 and at −45° in the next battery row 8, in the opposite direction to the respectively adjacent battery rows 8 (in FIG. 1, only two battery rows 8 are shown for the sake of clarity, but the rest of the arrangement can be seen from the distribution of the battery receptacles 6 in FIG. 2).

FIG. 3 illustrates schematically that the battery arrangement 10 fundamentally follows a sandwich construction, wherein the cover plates 2 enclose a (single-layer) core of batteries 1. Here, as with wall claddings or floor panels of sandwich construction, the battery arrangement 10 serves as a load-bearing structural component, which absorbs and/or transmits both inherent loads and introduced extraneous loads (cf. the arrows in FIG. 3). The battery arrangement 10 can thus replace existing structures of a vehicle since loads can be passed through the battery arrangement 10 via the cover plates 2 and the batteries 1. In order to absorb shear forces from different directions, the batteries 1 in this arrangement are aligned both with positive and negative slope angles α relative to the cover plates 2. In this way, additional structure-reinforcing components can be eliminated, which in turn optimizes the number of components, the weight and ultimately fuel consumption, i.e. the weight-dependent energy or power density of the aircraft 100 is improved.

It is possible, for example, for the cover plates 2 to be manufactured from a plastic, such as a thermoplastic, a metal material, e.g. an aluminium alloy, or a fiber-reinforced composite material, e.g. CFRP. Depending on the embodiment, the cover plates 2 together with the battery holders 3 and the battery receptacles 6 can be of integral design. In principle, the cover plates 2 can furthermore each be designed or configured as a cooling plate 4 and/or can have a cooling plate 4. For example, a multiplicity or plurality of fluid channels 7 can be provided, which can each be manufactured integrally with the cooling plate 4, e.g. from a metal material (cf. FIG. 2). In the illustrative embodiment in FIGS. 1 and 2, the fluid channels 7 extend transversely to the alignment of the individual battery rows 8. Building on the above teaching, it will become apparent to a person skilled in the art that alternative configurations of the cover plate 2 are possible, in which the fluid channels 7 take a different course and/or are supplemented or replaced by alternative cooling means, for example. In this illustrative embodiment, the fluid channels 7 and the battery holder 3 form a sawtooth profile which extends in the direction of the battery rows 8.

The specific electrical circuitry and connection of the batteries 1 can be carried out in any desired manner familiar to a person skilled in the art. By way of example, current collectors 5 in the form of conductor rails or the like as well as signal transmission layers etc. can be integrated into the cover plates 2, e.g. in order to communicate data from the batteries 1 to a battery management system (not depicted here). By way of example, the batteries 1 can be coupled for communication with a central processing unit via the signal transmission layer(s), wherein the processor unit can be designed to monitor, evaluate and possibly control a state or status of the at least one battery. The current collectors 5 can advantageously further reinforce the mechanical structure of the battery arrangement 10, e.g. in an embodiment consisting of or comprising a metal material.

The batteries 1 can be coupled at least on one side to the current collectors 5 via an electrically conducting spring (not shown) or the like, thus avoiding welding the batteries 1 to the current collectors 5. During assembly, the batteries 1 can simply be pushed or plugged into the battery holder 3, with tolerances being automatically compensated.

FIGS. 4a-c show an illustrative use of the battery arrangement 10 from FIGS. 1-3 in an aircraft wing 12, wherein batteries 1 corresponding to FIGS. 1-3 are installed both in the wing spars 13, the wing ribs 14 and the wing coverings 15 shown in FIG. 1 (cf. FIG. 4c). In principle, the battery arrangement 10 shown in FIG. 1 can be configured in relatively thin sandwich layers (two covering layers with one battery layer in between). In this sense, the battery arrangements 10 thus form a load-bearing constituent of the aircraft wing 12 and do not have to be integrated as separate components into the aircraft 100.

Figure 5:
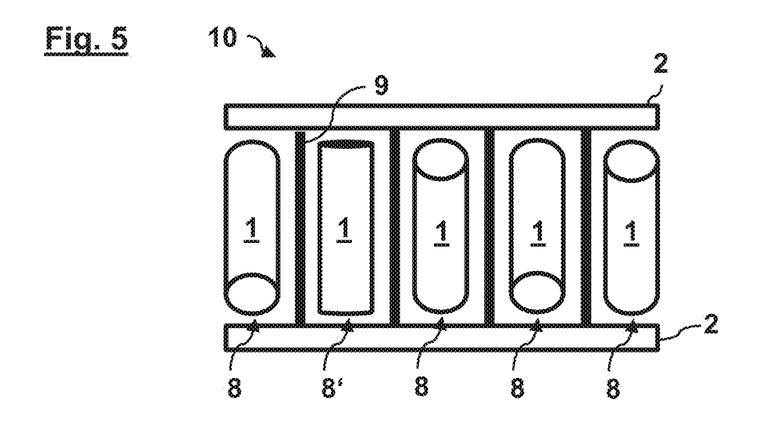
FIG. 5 shows a schematic side view of a battery arrangement according to another embodiment of the disclosure herein.

FIG. 5 shows a schematic side view of a battery arrangement 10 according to another embodiment of the disclosure herein. Here, FIG. 5 shows the battery arrangement 10 transversely to the direction of the battery rows 8, which alternately have positive and negative slope angles $\alpha$, e.g. ±45°. Furthermore, a proportion of the batteries 1 is arranged in intermediate battery rows 8' (only one is shown in FIG. 5 by way of example), which are situated between the battery rows 8 and in which the batteries 1 are aligned at a slope angle $\alpha$ of 90° relative to the cover plates 2. For the sake of clarity, the battery holders 3 are not shown in the figure. These can be designed in a manner corresponding to those in FIGS. 1-2, for example.

The embodiment shown in FIG. 5 furthermore comprises a multiplicity or plurality of shear walls 9, which connect the cover plates 2 to each other and each separate two battery rows 8 from each other. On the one hand, the shear walls 9 serve to reinforce the structure of the battery arrangement 10. On the other hand, the shear walls 9 can furthermore be designed or configured as protective walls or the like, e.g. as fire protection walls. The shear walls 9 could separate the individual battery rows 8 or intermediate battery rows 8' fluid tightly from one another, for example, thus ensuring that gases and/or liquids escaping in a damage event cannot propagate in an uncontrolled manner.

In the preceding detailed description, various features have been combined in one or more examples to improve the conciseness of the illustration. However, it should be clear here that the above description is of a merely illustrative and in no way restrictive nature. It serves to cover all the alternatives, modifications and equivalents of the various features and illustrative embodiments. Many other examples will be immediately and directly clear to a person skilled in the art from a consideration of the above description on the basis of their specialist knowledge.

The illustrative embodiments have been selected and described in order to explain as well as possible the principles underlying the disclosure herein and the possible applications thereof in practice. This will enable those skilled in the art to modify and use the disclosure herein and the various illustrative embodiments thereof in an optimum manner for the intended purpose.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 battery
2 cover plate
3 battery holder
4 cooling plate
5 current collector/conductor rail
6 battery receptacle
7 fluid channel
8 battery row
8' intermediate battery row
9 shear wall
10 battery arrangement
11 structural component
12 aircraft wing/aerofoil
13 wing spar
14 wing rib
15 wing covering
16 wing leading edge
17 wing trailing edge
100 aircraft
$\alpha$ slope angle

The invention claimed is:

1. A battery arrangement for load-bearing structural integration of batteries into a vehicle, the battery arrangement comprising:

two cover plates, each comprising:
- a plurality of current collectors in a form of rails; and
- a plurality of battery holders attached to each of the plurality of current collectors; and a plurality of batteries, which are held between the cover plates;

wherein the batteries are arranged in battery rows that are arranged next to each other and extend along the cover plates;

wherein each battery is in contact, on opposing longitudinal ends thereof, with a corresponding one of the current collectors of each of the cover plates and, on opposing lateral sides thereof, with a corresponding one of the battery holders of each of the cover plates;

wherein each battery in a same battery row contacts a different current collector of the same cover plate;

wherein the batteries in each of the battery rows are all aligned at a same slope angle relative to the cover plates to absorb and transmit loads; and wherein all of the batteries in a first proportion of the battery rows have a positive slope angle and all of the batteries in a second proportion of the battery rows have a negative slope angle.

2. The battery arrangement according to claim 1, wherein the slope angle in successive battery rows alternately has only a positive value or a negative value.

3. The battery arrangement according to claim 1, wherein a magnitude of the slope angle has values greater than 0° and less than 90°.

4. The battery arrangement according to claim 1, wherein a magnitude of the slope angle is 45°.

5. The battery arrangement according to claim 1, wherein a third proportion of the batteries is arranged in intermediate battery rows, the intermediate battery rows being situated between the battery rows of the first and second proportions, and wherein the batteries in the intermediate battery rows are aligned at a slope angle of 90° relative to the cover plates.

6. The battery arrangement according to claim 1, comprising:
shear walls, which connect the cover plates to each other, wherein two battery rows in each case are separated by one shear wall, wherein the shear walls are each at least one of a thermal distributor and a safety wall.

7. The battery arrangement according to claim 1, wherein the batteries are mounted on both sides positively or in a materially integral manner in the battery holders.

8. The battery arrangement according to claim 1, wherein the batteries are cylindrical and the battery holders have a curved profile to receive cylindrical batteries.

9. The battery arrangement according to claim 1, wherein at least one of the cover plates is a cooling plate.

10. The battery arrangement according to claim 9, wherein the cooling plate is formed with one or more channels.

11. The battery arrangement according to claim 1, wherein the battery arrangement is a load-bearing structural component for an aircraft or spacecraft.

12. The battery arrangement according to claim 11, wherein the battery arrangement is at least one of the group consisting of a side wall, floor panel, ceiling panel, skin area, wing spar, wing rib, and wing covering.

13. The battery arrangement according to claim 1, wherein the batteries are prismatic and the battery holders are configured to receive prismatic batteries.

14. An aircraft or spacecraft having a battery arrangement for load-bearing structural integration of batteries into the aircraft or spacecraft, the battery arrangement comprising:
two cover plates, each comprising:
- a plurality of current collectors in a form of rails; and
- a plurality of battery holders attached to each of the plurality of current collectors; and a plurality of batteries, which are held between the cover plates;

wherein the batteries are arranged in battery rows that are arranged next to each other and extend along the cover plates;

wherein each battery is in contact, on opposing longitudinal ends thereof, with a corresponding one of the current collectors of each of the cover plates and, on opposing lateral sides thereof, with a corresponding one of the battery holders of each of the cover plates;

wherein each battery in a same battery row contacts a different current collector of the same cover plate;

wherein the batteries in each of the battery rows are all aligned at a same slope angle relative to the cover plates to absorb and transmit loads; and wherein all of the batteries in a first proportion of the battery rows have a positive slope angle and all of the batteries in a second proportion of the battery rows have a negative slope angle.

15. The aircraft or spacecraft according to claim 14, wherein the battery arrangement forms a load-bearing constituent of a load-bearing structural component of the aircraft or spacecraft.

16. A battery arrangement for load-bearing structural integration of batteries into a vehicle, the battery arrangement comprising:
two cover plates, each comprising:
- a plurality of current collectors in a form of rails; and
- a plurality of battery holders attached to each of the plurality of current collectors;

a plurality of batteries that are held between the cover plates and are aligned at a slope angle relative to the cover plates to absorb and transmit loads;

a first battery row comprising a first subset of the plurality of batteries, which are arranged next to each other in a row and extend along the cover plates, wherein all batteries in the first battery row are aligned such that the slope angle is a positive slope angle; and a second battery row comprising a second subset of the plurality of batteries, which are arranged next to each other in a row and extend along the cover plates, wherein all batteries in the second battery row are aligned such that the slope angle is a negative slope angle;

wherein each battery is in contact, on opposing longitudinal ends thereof, with a corresponding one of the current collectors of each of the cover plates and, on opposing lateral sides thereof, with a corresponding one of the battery holders of each of the cover plates;

wherein each battery in a same battery row contacts a different current collector of the same cover plate; and wherein the first battery row and the second battery row are adjacent to each other and both contact the cover plates.

17. The battery arrangement according to claim 16, wherein the slope angle for adjacent battery rows alternates between a positive slope value and a negative slope value.

18. The battery arrangement according to claim 16, wherein the battery arrangement is a load-bearing structural component for an aircraft or spacecraft.

19. An aircraft or spacecraft having at least one battery arrangement according to claim 16.

* * * * *